Patented Nov. 8, 1927.

1,648,314

UNITED STATES PATENT OFFICE.

ROBERT C. LULY, OF ST. LOUIS, MISSOURI.

SOLVENT.

No Drawing.    Application filed September 11, 1926. Serial No. 134,945.

The object of this invention is to provide a solvent to be used as a substitute for grain alcohol in extracting the active principles from crude drugs, or in otherwise forming solutions, tinctures, and the like.

The improved solvent is composed of isopropyl alcohol, ($CH_3-CH(OH)-CH_3$), acetic acid ($C_2H_4O_2$ or $CH_3-COOH$), a suitable flavor, such as apple oil, (amyl butyrate, and other esters compounded), and water ($H_2O$). These ingredients are combined in the following proportions by volume:

Isopropyl alcohol, 60%; acetic acid, 3%; apple oil, .2%; and water, approximately 37%.

I have found that a solvent formed according to the above formula will, in the vast majority of cases, act as an efficient substitute for alcohol in the extraction of the active principles from crude drugs, in the production of medicinal preparations, and in various ways in which alcohol is used in forming solutions. The secondary alcohol I employ is, alone, not as efficient in making extractions as grain alcohol, but I have found that the addition of a small amount of acetic acid will increase its power in this respect, owing to the well-known property possessed by acetic acid of dissolving various organic substances. When the secondary alcohol and acetic acid are diluted with water, the resultant mixture has about the same toxicity as grain alcohol, and the mixture is, in most cases, equally efficient, and in many cases, more efficient than the grain alcohol when used as a solvent for drugs.

The flavoring ingredient, preferably apple oil, counteracts the flavor imparted to the mixture by the acetic acid. So far as I have been able to determine, there is no difference in the aroma between solutions or extracts prepared with the use of my solvent and those prepared with the use of grain alcohol.

A distinct advantage of my improved solvent is the fact that it is not subject to the restrictions imposed by law upon the handling and use of grain alcohol, and, moreover, its cost is about one-half that of grain alcohol.

I claim:

1. A solvent consisting of isopropyl alcohol, acetic acid and water.

2. A solvent comprising isopropyl alcohol, acetic acid, water and apple oil mixed in substantially the proportions by volume of isopropyl alcohol 60%, acetic acid 3%, water 37% and apple oil .2%.

3. A solvent consisting of isopropyl alcohol, acetic acid, water, and a flavoring ingredient capable of counteracting the flavor of the acetic acid.

In testimony whereof, I have hereunto set my hand.

ROBERT C. LULY.